United States Patent [19]
Fuchs

[11] Patent Number: 5,243,953
[45] Date of Patent: Sep. 14, 1993

[54] DIESEL FUEL PREHEATER FOR ENGINES

[75] Inventor: Werner K. Fuchs, München, Fed. Rep. of Germany

[73] Assignee: Hermann-Frank Müller, Bonn-Bad Godesberg, Fed. Rep. of Germany

[21] Appl. No.: 915,932

[22] Filed: Jul. 17, 1992

[30] Foreign Application Priority Data

Jul. 18, 1991 [DE] Fed. Rep. of Germany ....... 4123866

[51] Int. Cl.$^5$ ............................................. F02B 31/00
[52] U.S. Cl. .................................... 123/557; 123/549; 123/552
[58] Field of Search ............... 123/557, 549, 552, 547, 123/545, 546

[56] References Cited

U.S. PATENT DOCUMENTS

| | | | |
|---|---|---|---|
| 4,512,323 | 4/1985 | Ruth et al. | 123/557 |
| 4,748,960 | 6/1988 | Wolf | 123/557 |
| 4,754,741 | 7/1988 | Houtman | 123/557 |
| 4,811,719 | 3/1989 | Baumann | 123/557 |
| 5,036,825 | 8/1991 | Stone | 123/557 |

FOREIGN PATENT DOCUMENTS 3723803 7/1987 Fed. Rep. of Germany .

Primary Examiner—David A. Okonsky
Assistant Examiner—M. Macy
Attorney, Agent, or Firm—Robert W. Becker & Associates

[57] ABSTRACT

Diesel fuel preheaters with a heat exchanger and electric heating serve, for example, at low temperatures to maintain the flowability of diesel fuel and furthermore to quickly heat diesel fuel to achieve defined conditions for a fuel conserving and emission reduced combustion of the fuel and a better engine performance. The diesel fuel preheaters are provided with an integrated control unit and are adaptable to various engines and operational conditions. A special electric heating element in cooperation with the integrated control unit and the heat exchanger provide a fast and economic preheating of the diesel fuel. Furthermore, various advantageous couplings and mechanisms for the regulation of the heat transfer from the heat-deliverying medium such as cooling water to the diesel fuel at the heat exchanger are shown and described.

17 Claims, 3 Drawing Sheets

DIESEL FUEL PREHEATER FOR ENGINES

BACKGROUND OF THE INVENTION

The present invention relates to a diesel fuel preheater for engines, especially motor vehicle engines, in which the diesel fuel is heated electrically and by a heat exchanger.

Electrically heated diesel fuel preheaters as well as preheaters for engines in which the cooling water, the motor oil, the exhaust gases, the engine block itself and similar heat sources are used to preheat the diesel fuel are known.

However, it is disadvantageous that electric diesel fuel preheating requires a relatively great and long lasting current consumption with a respective load on the battery and the electric on-board system. When heat exchangers are used, it is disadvantageous that the heating effect is usually very slow. This might be compensated for by oversizing the respective heat exchanger, however, this results in return in an overheating of the diesel fuel which may lead to the formation of vapor bubbles within the fuel.

Originally, the primary function of such diesel fuel preheaters has been to prevent the partial solidification of the diesel fuel at low temperatures in order to improve the flow characteristics especially through the fuel filter to thereby prevent cold start and running problems of the engine. Nowadays, a diesel fuel preheater should also fulfill other requirements with respect to environmental issues by reducing the cold running characteristics, improving the engine performance and reducing the fuel consumption as well as the emission values.

In view of these requirements a fast and steeply inclined fuel heating to a certain temperature of approximately 50° to 60° C. is desirable and the temperature should be maintained at this level in order to quickly provide favorable defined conditions for the engine performance. Known diesel fuel preheaters do not fulfill the above mentioned requirements or they have the disadvantage of being of a complicated design and expensive, requiring a lot of space and providing low adaptability. A good adaptability is desirable in order to provide a universal application of only a few sizes of diesel fuel preheaters for various engines.

It is therefore an object of the present invention to provide fast and favorable fuel heating in a simple, economic, and reliable manner with a space and cost conserving preheater and to prevent thereby the known disadvantages.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
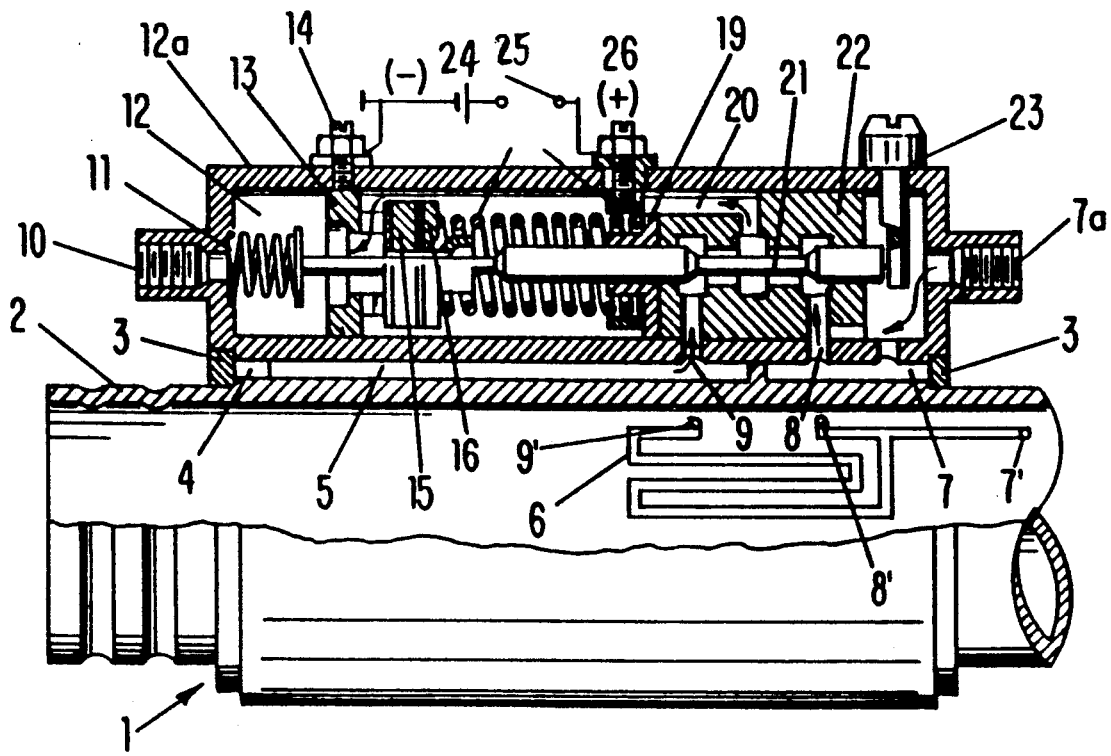
FIG. 1 shows a diesel fuel preheater of the present invention with a heat exchanger and, in a part-sectional view, an electrical heating and control device.

The diesel fuel preheater for engines of the present invention is primarily characterized by an electric heating chamber positioned downstream of the heat exchanger; a 3/2 way valve connected to the electric heating chamber and the heat exchanger, whereby the 3/2 way valve, in an activated state, guides a flow of diesel fuel through the heat exchanger and the heating chamber, and, in a deactivated state, guides a portion of the flow of diesel fuel through the heat exchanger, and the 3/2 way valve further comprising an adjustment means for regulating the flow of diesel fuel; an electric heating means fastened within the heating chamber; and a switching unit connected to the heating means. The adjustment means may be in the form of a displaceable piston, partially comprised of a ferromagnetic material, and positioned in a slidable manner within the heating means and the 3/2 way valve. Preferably, a device for adjusting a rest position of the piston is also provided. A thermostat may be provided within the heating chamber and may act on the piston. The heating means provided may be in the form of a heating coil. According to the characterizing features of the present invention simple and inexpensive components are provided which, within a tight space, provide a plurality of functions. For example, the diesel fuel heating means may simultaneously function as an electromagnet and the valve, respectively, its piston as the magnet anchor.

In a preferred embodiment the heating means further comprises a PTC (positive temperature coefficient) heating element fastened within the heating chamber which is positioned adjacent to an outlet of the heating chamber and directly adjacent to the heating coil, whereby the PTC heating element is in a serial connection with the heating coils.

The heating means is preferably comprised of a material having a positive temperature coefficient.

Furthermore, a PTC measuring element may be provided which is positioned at an outlet of the heating chamber and connected to the switching unit. With this embodiment components are provided which fulfill a plurality of tasks so that thereby a substantial cost reduction is possible. In order to achieve a simple and favorable adaptability of the inventive diesel fuel preheaters to various engines or to various climatic conditions and to provide further advantages such as cost reduction due to decreasing of the number of types of preheaters needed thereby achieving lower storage costs, further advantageous embodiments of the present invention are set forth in the following paragraphs.

The heating means may be in the form of an exchangeable heating cartridge that is positioned within the heating chamber.

In another embodiment the heat exchanger may be comprised of a tube having a heat-delivering medium flowing through its interior and diesel fuel streaming past its exterior mantle surface which functions as the a heat exchanging surface. The tubes have an annular disk at ends thereof and the exterior mantle surface is provided with ribs extending in an axial direction between the annular disk such that a first end is connected to the sealing disk and a second end is spaced at a distance from the annular disk. Adjacent ones of the rib thus alternatingly provide a space at a respective one of the annular disk, thereby forming a meandering channel system. A transverse stay is positioned between two adjacent ribs to close the channel system. Bores are provided on either side of the transverse stay for connecting the 3/2 way valve to the channel system.

In another embodiment the heat exchanger may be comprised of a cup-shaped housing which is immersed in a heat-delivering medium, whereby the housing has inner and outer ribs. The heating means is in the form of an exchangeable heating cartridge that is coaxially surrounded by a tube that is open at one end. The heating cartridge together with the tube delimits the heating chamber. They are inserted in the interior of the housing. The tube together with the inner ribs forms channels and the heating chamber is connected with one end, that is formed by the open end of the tube, connected to the channels and with the other end to the 3/2 way valve.

In a further embodiment of the present invention the heat exchanger comprises a tube with radial outer ribs, whereby the tube with an outer mantle surface is in contact with the diesal fuel and with an inner mantle surface thereof is in contact with a heat-delivering medium. The individual ribs have varying outer diameters and are arranged over a length of the tube in groups of their respective outer diameters. The tube is provided with a sliding sleeve having a plurality of radial cutouts that are arranged in pairs opposite one another over a length of the sliding sleeve. The radial cutouts provide openings to expose the ribs. The sliding sleeve is connected to the adjustment means which is, for example, in the form of a displaceable piston.

In another alternative the heat exchanger comprises a tube with axial ribs whereby the tube with an outer mantle surface thereof is in contact with the diesal fuel and iwth an inner mantle surface thereof with a heat-delivering medium. The ribs form axial channels and a rotary slide valve is positioned at least one end of the axial channel and connects to the adjustment means. The rotary slide valve controls the flow of diesel fuel through the axial channels by opening and closing at least one of the axial channels.

Furthermore, it is expedient that the heat exchanger comprises an inner and an outer tube arranged concentrically to one another so that they provide therebetween an annular space for the diesel fuel. The interior of the inner tube provides space for a heat-delivering medium. A coil of a band-shaped heat-conducting tensile material is arranged within the annular space and contacts the surfaces of the inner and outer tubes to form a channel for the diesel fuel. The coil is removable from at least one of the surfaces of the inner and outer tubes for adjusting a heat transfer to the diesel fuel. The coil is preferably at least partially formed of a gauze-like material. It is expedient to fasten the coil with one end thereof to the inner tube and with the other end to the outer tube whereby the inner and outer tubes are adjustable relative to one another for adjusting the heat transfer to the diesel fuel. Preferably, the adjustment means is a strain gauge thermostat that is connected to the coil.

The advantages of the inventive diesel fuel preheater, on the one hand, lie in its favorable function by which the diesel fuel is quickly and economically heated and, on the other hand, in its simple and compact design which allows for material and rate reduction and results in an inexpensive manufacture. The electric diesel fuel heating means functions only as an auxiliary means and is switched on automatically only when and as long as low temperatures, for example, during a cold start, require its assistance. Under any other circumstances the diesel fuel heating is achieved solely by the heat exchanger which for this purpose uses the heat-provided by the cooling water. An unnecessary electric heating of the diesal fuel is thus automatically prevented since the increasing engine, respectively, cooling water temperature, immediately contributes to the diesel fuel heating so that in the beginning the electric heating is supported, but then automatically switched off when the heat exchanger alone may reach the desired diesel fuel temperature. With the fast temperature increase which may be achieved by the inventive diesel fuel preheater, the ignition characteristics of the diesel fuel are quickly improved which, especially during cold start and cold running conditions, is very advantageous. With an improved combustion and a reduction of the period of cold running the diesel fuel consumption and the exhaust emission values are reduced. An effective and fast diesel fuel preheater may further contribute to the reduction of friction, wear and engine noises during the cold running period. For an engine operating at its usual operating temperature the preheated diesel fuel with a correspondingly uniform density provides defined conditions for an optimum injection, combustion and energy transfer. Further advantages may be taken from the following description of preferred embodiments.

DESCRIPTION OF PREFERRED EMBODIMENTS

The present invention will now be described in detail with the aid of several specific embodiments utilizing FIGS. 1 through 7.

Figures 6, 6A:
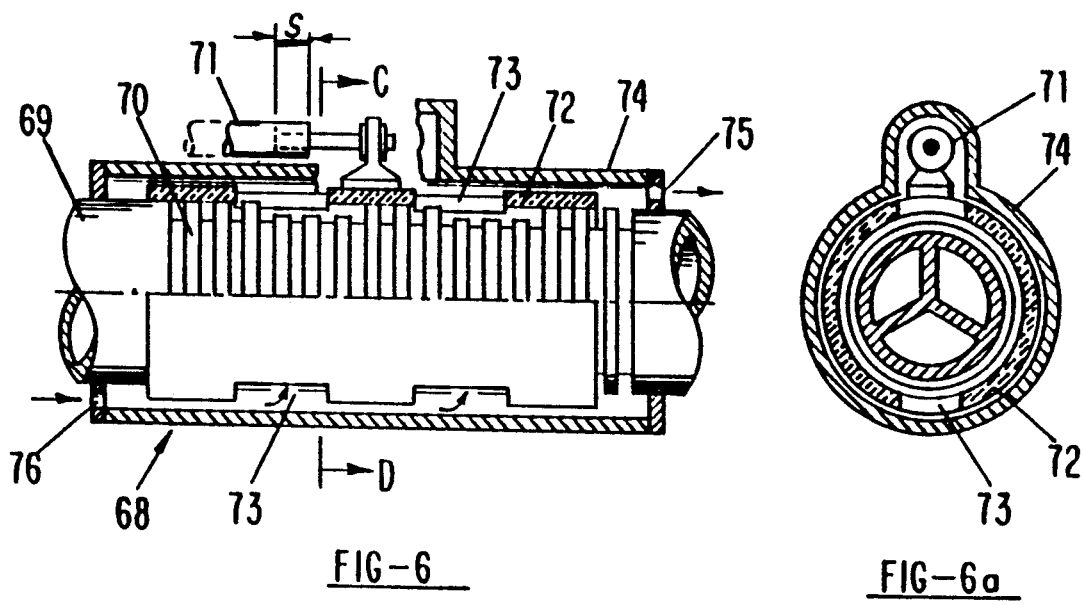
FIG. 6 shows a controllable diesel fuel preheater having a sliding sleeve.
FIG. 6a is a part-sectional view along the line C-D of FIG. 6.

FIG. 1 shows a view of an inventive diesel fuel preheater 1 which is shown in a part-sectional representation and which may have, for example, a pear-shaped cross-section similar to the housing 74 shown in FIG. 6a. A tube 2, preferably made from aluminum, is, for example, inserted into the cooling water circuit of a diesel engine. The tube 2 carries the cooling water and serves as a heat exchanger 6. At its outer circumference it is provided with a channel system 4 for the diesel fuel to be heated. The tube 2 may also be provided at its inner circumference with further ribs for an improved heat transfer (not represented in the drawing). The tube 2 may be inserted into the cooling water circuit by for example, slipping the hose end of the cooling water hoses onto the ends of the tubes and fastening the ends with clamps. It is also possible to provide the ends of the tube 2 with flanges that have respective sockets for the connection to the hose end. Furthermore it is possible that the sockets are embodied as so-called hose quick couplings which are known from DE-OS 37 29 570. It is also possible to provide one end of the tube 2 of the heat exchanger 6 with a flange which is connected to the engine block and to connect the cooling water hose to the other free tube end. The channel system 4 provided at the circumference of the tube 2 may be formed in any desirable manner and, for example, may be formed by ribs 5. The channel system 4 is limited on both ends of the tube by annular disks 3 and is, for example, sealed by respective sealing rings. The channel system 4 in FIG. 1 is represented in a schematic and scale-reduced manner (to facilitate the understanding of the drawings) in the form of a meandering tube 6 with an inlet bore 7' and outlet bores 8' and 9'. Above, corresponding connecting bores 7, 8, and 9 of the corresponding 3/2 way valve 22 are shown. The channel system 4 is represented in more detail in FIG. 1a. The 3/2 way valve 22 which functions as a switching valve is positioned within the housing 12a of the heating chamber 12. The connecting bore 7 is connected to the fuel line which supplies fuel from the tank via a fuel pump. The oppositely arranged outlet 10 is connected to a fuel line which guides the fuel via a filter to the injection pump. Adjacent to the 3/2 way valve 22 within the housing 12a of the heating chamber 12 an electric heating coil 17 is arranged which, for example, may be made from a single layer of windings of a relatively thick resistance wire. The tube-shaped heating coil 17 is connected to a PTC heating element 15 arranged in the vicinity of the outlet 10 of the heating chamber 12 via an electrically and electromagnetically conductive socket 16 that is, for example, comprised of a ferromagnetic material such as iron. The PTC heating element 15 and the heating coil 17 are connected in series. The PTC heating element 15 is contacted at a face thereof, for example, by metal disks and on the left hand side of the drawing by a metal socket 13 and a contact screw 14 connected to the housing 12a respectively to the minus or ground leads of the vehicle battery 24. The right end of the heating coil 17 is electrically insulated by a bushing 19 and is connected via a conductive annular contact 18 to the plus pole 26 of the battery 24 which is insulated relative to the housing. The PTC heating element 15 is expediently provided with a relatively small electric resistance, i.e., it is suitable for a small electric voltage and great electric current intensity. Accordingly, the electric heating capacity for the electric diesel fuel preheating is provided mostly by the heating coil 17 and to a lesser extent by the PTC element 15. Due to the relatively small electric power generated within the PTC element 15 it may be manufactured in a more compact form and at lower costs compared to a heating element which must provide the entire electric power. The PTC element 15 and the heating coil 17 are provided and constructed such that an intensive contact with diesel fuel is provided whereby the diesel fuel streams along all sides of the PTC element 15 and the heating coil 17.

It is preferable that the heating coil 17 is comprised of a material, respectively, an alloy, which has a positive temperature coefficient and which may be provided as a lead on a ceramic sleeve. Due to such an embodiment a self adjusting means is integrated into the heating coil 17a and a separate PTC element 15 is obsolete. The electric heating chamber 12 is connected via the shown channels to the center branch 20 of the 3/2 way valve 22 and via the socket 13 to the outlet 10 of the housing 12a of the heating chamber 12. A piston 21 which is at least partially comprised of a ferromagnetic material, for example, iron, is axially slidably supported within the heating coil 17 and the 3/2 way valve 22. Its right end contacts a set screw 23 which presses the piston 21 onto a spring 11. With the aid of this set screw 23 the rest position of the piston 21 may be finely and coarsely adjusted, respectively, selected. The flattening of the set screw 23 on one side as shown in drawing 1, provides for two selectable rest positions of the piston 21, for example, for summer and winter operation of the engine. Instead of the screw 23 other setting devices could be provided for the same task, such as a pressure button together with a locking element.

In another embodiment a bimetallic or strain gauge thermostat may be positioned with the heating chamber 12 in order to replace the spring 11 whereby the thermostat is connected to the piston 21 and acts on it in order to displace the piston with increasing temperature to the right in a continuous or discontinuous manner. Both adjustment movements are possible by providing plate-spring-like bimetallic disks which may be provided with a snap effect.

As can be seen in FIG. 1, all of the components 11 to 22 are combined in the form of a cartridge within the housing 12a and positioned on the diesel fuel preheater 1. The effect of the PTC heating element 15 with its simple automatic temperature respectively heating current imitation is maintained despite the relatively compact design whereby at the same time the magnetic field of the heating coil 17 is used for controlling functions. The advantageous embodiment and use of individual components for multiple functions provides for an uncomplicated inexpensive design with an increased reliability. The compact and slim design also reduces space requirements and the cartridge form provides for a simple exchangeability of an important componentry. Especially, it is possible to produce such cartridges with different heating power which may be positioned within the same housing of the diesel fuel preheater 1. Resulting advantages are, for example, the universal applicability of the diesel fuel preheater and, at the same time, reduced storage costs.

Figure 1A:
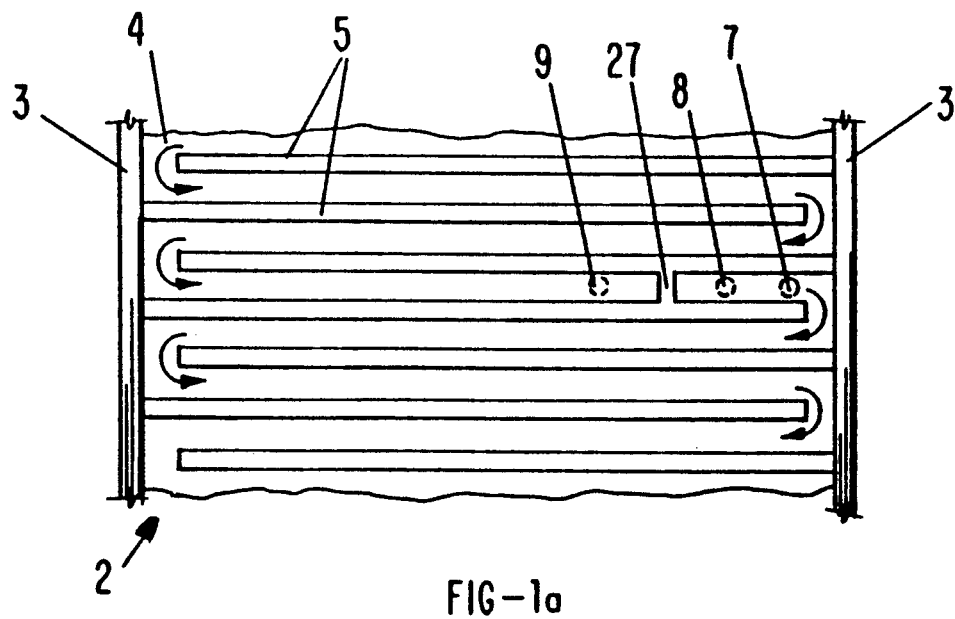
FIG. 1a is a developed repesentation of the meander-like channel system of the heat exchanger according to FIG. 1 which is shown in a shortened representation relative to the circumferential direction.

FIG. 1a shows a plan view of a developed section of the channel system 4 of the tube 2. The ribs 5 of the tube 2 are alternatingly positioned to the right and the left so that they alternatingly contact the faces of the annular rings or disks 3. Thus, a meander-like channel system 4 results. This channel system 4 is interrupted in the vicinity of the 3/2 way valve 22 by a transverse rib 27. The left channel next to the transverse rib 27 is connected to the connecting bore 9 of the 3/2 way valve 22 and the right channel opens into the connecting bores 7 and 8 as can be seen in FIG. In this embodiment the tube 2 may be produced in a simple and inexpensive manner, for example, by injection molding.

In the following the function of the diesel fuel preheater 1 during a cold start operation will be explained. The electric heating coil 17 with its contacts 14 and 26 is connected via a symbolically represented switch 25 to the vehicle battery 24. Expediently, the switch 25 respectively the heating coil 17 is switched on simultaneously with the heater plugs of the diesel engine, for example, by being connected to the switch for the heater plugs or a control unit for the heater plugs. The switch 25 remains in its closed position after the start of the diesel engine for a limited time or as long as the engine is running. The heating coil 17 which is supplied with a strong electrical heating current pulls the piston 21 to the left. Accordingly, the diesel fuel line from the connecting bore 8 to the channel 20 is closed and, at the same time, another fuel line is opened via the connecting bore 9 to the channel 20 in the direction towards the electrical heating chamber 12. The fuel flows accordingly from the inlet 7a via the connecting bore 7 through the entire channel system 4 of the heat exchanger 6 before it enters the downstream electrical heating chamber 12 and the outlet 10 via the connecting bore 9/channel 20. The started engine supports the electrical heating because due to the increasing cooling water temperature preheated fuel enters the electrical heating chamber 12. The fuel temperature increases accordingly at a fast rate and the electrical heating period is therefore shortened. When the fuel temperature has reached the desired value the PTC heating element 15 provided in the vicinity of the outlet of the heating chamber 12 switches off the electrical heating current so that the spring 11 pushes the piston 21 to the right into its rest position represented in the drawing. The piston 21 remains in this position in which the heat exchanger capacity is reduced due to the partial stream created by the slightly open valve path through connecting bore 9/channel 20 when the engine has reached its operating temperature. The fuel temperature at the outlet 10 is adjusted via the screw 23 such that the PTC element 15 keeps the electric heating switched off. When low temperatures are present, as for example in the winter season, the piston 21 may be adjusted to the left via the set screw 23 so that the portion of the diesel fuel which streams through the entire heat exchanger and from there via connecting bore 9 into the heating chamber 12 is increased and the partial stream at a lower temperature which flows through the connecting bore 8 is accordingly reduced. In order to perform the desired fuel preheating in a fast and current-conserving manner the heat exchanger with its channel system 4 is preferrably oversized. Due to the switching of the flow paths of the diesel fuel in the aforementioned manner via connecting bore 8 or 9 an overheating of the diesel fuel is prevented without having to provide a thermostat.

Figure 2:
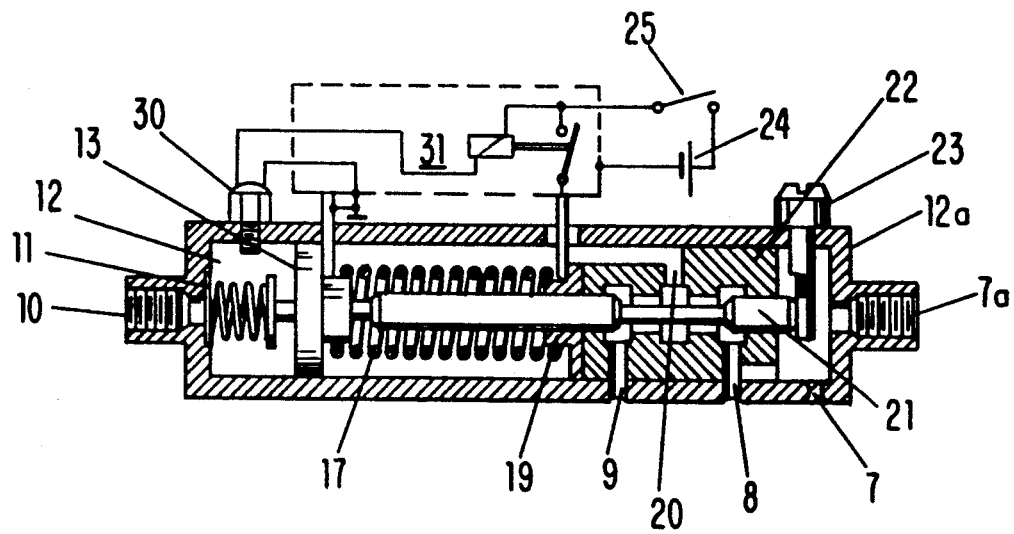
FIG. 2 shows a cross-sectional view of a further electrical heating and control device for a diesel fuel preheater according to FIG. 1.

FIG. 2 shows a different embodiment of the cartridge enclosed in housing 12a according to FIG. 1. In this embodiment a PTC measuring element 30 is fastened to the housing 12a in the vicinity of the outlet 10 for controlling the temperature of the preheated diesel fuel. The PTC measuring element 30 is electrically connected to a switching device 31 to which the heating coil 17 and the battery 24 of the vehicle together with the switch 25 are also connected. One end of the heating coil 17 is, for example, electrically connected to the housing 12a and the ground respectively minus lead of the battery 24 while the other end is connected to the housing of the switching device 31 in an insulated manner. The switching device 31 may be comprised of a semiconductor or, in the simplest manner, may be a relay. The excitation windings of the relay are connected in series with the PTC measuring element 30 and its switching contact, as can be seen in the drawing, is connected to the heating coil 17. The relay is automatically activated when the switch 25 is closed and remains closed as long as the fuel has not reached the desired temperature at the outlet 10. The construction and the function of the other components is similar to the embodiment described in FIG. 1.

Figure 3:
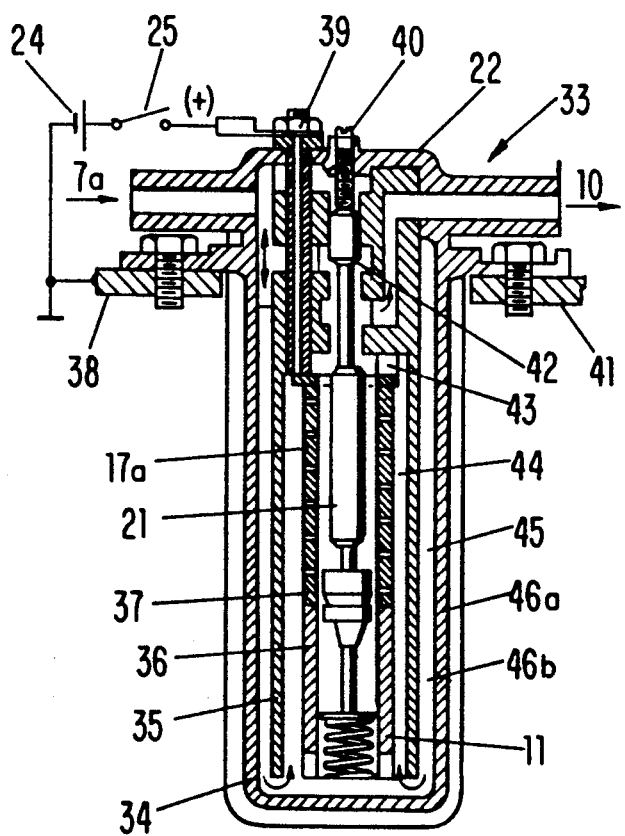
FIG. 3 is a cross-sectional view of an inventive diesel fuel preheater having a heat exchanger which is immersed into a heat-delivering medium and further having an electric heating and control device.

In FIG. 3 a diesel fuel preheater 33 is represented which is immersed into the heat-delivering medium which may be a liquid or a gas. This diesel fuel preheater 33 is, for example, flanged to a bore at the engine block 41 so that the cooling water streams past it. It is however also possible that the diesel fuel preheater is exposed to the motor oil, hot air or the exhaust gases. At least partially it is also directly heated from the engine block 41 via the flange. The tube-shaped or cup-shaped housing 34 which is, for example, comprised of cast aluminum and which serves as the heat exchanger, is provided at its outer and inner circumference with axially oriented ribs 46a and 46b. In the center of the housing 34 a tube-shaped electric heating cartridge 17a is provided which has integrated therein a PTC element in the form of a coil-shaped lead which has a positive temperature coefficient. The heating cartridge 17a is surrounded by a tube 35 which is open at its lower end and which contacts the inner ribs 46b of the housing 34 so that between the ribs axially extending channels for the diesel fuel to be preheated are formed. The lower end of the heating cartridge 17a is fixedly connected to the housing 34 via an electrically conducting bushing 36, which is provided with a bearing 37 for the piston 21, so that the heating cartridge 17a is connected to the ground contact 38. At its upper end the heating cartridge 17a is connected to an electrically insulating contact 39. The spring 11 which is disposed within the bushing 36 pushes the piston 21 into its resting position which is selectable via a set screw 40 at the 3/2 way valve 22.

The function of the above described cartridge will be explained in the following paragraph. In a cold start situation or when the fuel temperature is too low, the PTC heating cartridge 17a is switched on which in return pulls the piston 21 in a downward direction. The upper flow path via 42-10 is thus closed and the lower previously partially open flow path 43-10 is open entirely. Accordingly the entire flow of diesel fuel flows from the inlet 7a through the heat exchanger channels 45. Then it flows in the direction of the arrow in an upward direction through the electric heating chamber 44 and the lower valve opening 43 towards the outlet 10. As soon as the heat exchanger provides the desired fuel temperature by itself the electric heating is automatically shut off and the piston 21 is reset via the spring 11 into its rest position at the set screw 40. The piston 21 remains in this position during the operation of the engine so that only a partial flow of diesel fuel flows through the heat exchanger. The effect of heat exchanger which is oversized in order to provide a faster heating action is thus reduced from its previous maximum efficiency to its normal efficiency in which no overheating of the diesel fuel at the outlet 10 occurs.

Figure 4:
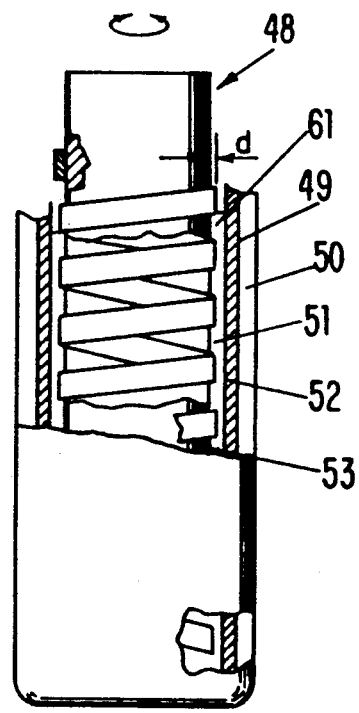
FIG. 4 shows a diesel fuel preheater with an immersed, controllable heat exchanger.

The diesel fuel preheater 48 according to FIG. 4 has an immerseable heat exchanger in which the heat transfer may be controlled in a continuously adjustable manner. The cup-shaped housing 49 of the heat exchanger which may be comprised of cast aluminum is provided at its outer circumference with ribs 50 and at its inner circumference with a smooth cylinder bore 51. A coil 52 made from a heat conducting material such as aluminum band is wound such that it contacts the walls of the cylinder bore 51 with a prestress. One end of the coil 52, for example, the lower end, is fixedly connected to the housing 49 so that no rotation may occur. Within the coil 52 a tube 53 is provided or, in another embodiment, the tube 35 of the heating cartridge spaced at a relatively small distance D from the coil. The upper end of the coil 52 is fixedly connected to the tube 53 so that no rotation can take place. Advantageously, the coil 52 may be fastened to the tube and the housing by a tongue-groove means in a rotation-fast manner (not shown in the drawing). The coil 52 may be made of a flexible heat conducting gauze band, for example, a metal band.

In the following paragraph the function of the aforementioned cartridge will be explained. The diesel fuel to be heated flows into the cylinder bore 51 which surrounds the tube 53 (or 35) and through the channel which is formed by the coil 52 and its spaced apart windings. The diesel fuel is preheated to a great extent because the coil 52, on the one hand, is usually in a tight metallically conductive contact with the housing 49 and, on the other hand, provides a great surface area for the heat transfer. When for other applications or for certain periods of time a reduced heat transfer is desired, the tube 53 is turned relative to the housing 49 such that at least a portion of the coil windings 52 are removed from the inner mantle surface of the cylinder bore 51. The removed windings which, in this case, may be contacting the inner tube 53 then hardly transfer heat because the diesel fuel has a bad heat conductivity and the coil is insulated from the housing 49. The diesel fuel preheater 48, with the same outer dimensions, is thus universally adaptable and employable for various diesel fuel engines.

Figures 5, 5A:
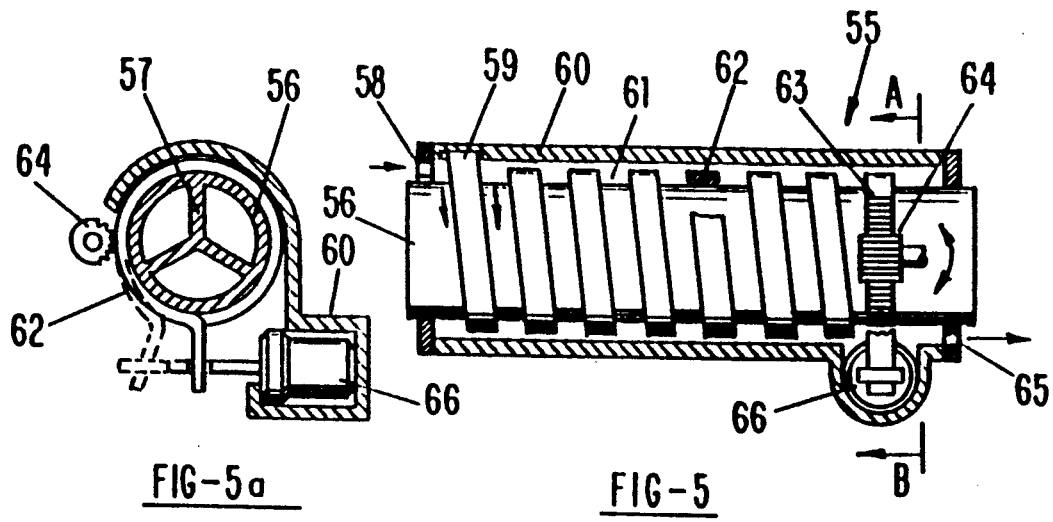
FIG. 5 shows a diesel fuel preheater which is adjustable and controllable with respect to varying the heat transfer.
FIG. 5a shows a partial cross-sectional view along the line A-B of FIG. 5.

FIG. 5 shows an adjustable and controllable diesel fuel preheater 55 with a continuous inner tube 56 through which the heat-delivering medium, for example, cooling water, flows. Ribs 57 provided thereat serve to produce a better heat transfer. An outer tube-like housing 60 surrounds the inner tube 56 in a concentric manner so that between the two tubes an annular space 61 is formed. The annular space 61 is closed off at the tube ends and is provided with an inlet opening 58 and an outlet opening 65 for the diesel fuel. A prestressed coil 62 is tightly wound about the outer circumference of the tube 56 which has a smooth outer surface. This coil 62 is comprised of a material which has excellent heat conducting characteristics such as a flat aluminum band. One end of the coil 67 is for example connected with a nut 59 to the housing 60 while the other end is free, respectively adjustable or controllable. For this purpose, teeth 63 are provided at the coil 62 which engage a toothed wheel 64 which is rotatably mounted at the housing 60. Instead of the teeth and the toothed wheel, a worm gear may be provided. When the windings of the coil 67 tightly embrace the tube 56, the heat transfer is great and when the windings are only in a loose contact with the tube 56 only a small amount of heat is transferred to the diesel fuel within the annular space 61. Due to the adjustability of the coil 62 the diesel fuel preheater 55 is extremely adaptable and universally applicable.

In another embodiment an automatic continuous control of the diesel fuel temperature is achieved by connecting the coil 62 to a strain gauge element or thermostat 66 which is fastened to the housing 60 in the vicinity of the outlet opening 65. This strain gauge thermostat 66 varies the heat exchange with the coil 62 such that the diesel fuel temperature at the outlet opening 65 is almost constant. The coil 62 provides an inexpensive design of the diesel fuel preheater 55. It enlarges the surface area which is employed for the heat transfer, forms a suitable channel for the diesel fuel and furthermore serves as a temperature control.

In another embodiment, a few of the windings of the coil 62 may be fixedly connected to the tube 56, for example, by welding them to the tube 56, while a plurality of other windings are adjustable. A conductive gauze material which is fastened between the adjustable windings 62 and the tube 56 may be used to improve the heat transfer (not shown in the drawings).

FIG. 6 shows a controllable diesel fuel preheater 68 with a heat exchanger tube 69 that is provided with radial ribs 70 of various diameters. These ribs 70 are arranged over the length of the tube 69 in alternating grooves of greater and smaller diameters. The tube 69 is provided with a sliding sleeve 72 which is used as a heat exchange control together with the piston 71 or a thermostat 66. The sliding sleeve 72 has cutouts 73 which are arranged as pairs over the lengths of the sliding sleeve whereby the pairs are spaced from one another in the axial direction and whereby the distance between the pairs of cutouts corresponds to the distance between the groups of ribs having an identical diameter. The two cutouts of one pair are spaced from one another by an angle of 180°. The tube 69 together with the sliding sleeve 72 is enclosed by a housing 74 which is provided with a diesel fuel inlet opening 76 and, diagonally opposed, an outlet opening 75. As can be seen from FIG. 6 the smaller ribs of the tube 69 are continuously operating as heat exchangers due to the design of the sliding sleeve 72. The greater ribs on the other hand, depending on the position of the sliding sleeve, may be switched on and off as desired so that they contribute to the diesel fuel preheating to a lesser or greater extent. The sliding sleeve 72 which is comprised of a heat insulating or a metallic material is easily adjustable and, despite a small adjusting distance s, it may switch on and off a plurality of ribs 70. When the piston 71 is moved to the left by the amount corresponding to the adjusting path s practically all ribs are in an exposed position for the heat transfer. In the position shown in the drawing a plurality of ribs with a greater diameter are insulated by the sliding sleeve 72. i.e. they are switched off.

Figures 7, 7A:
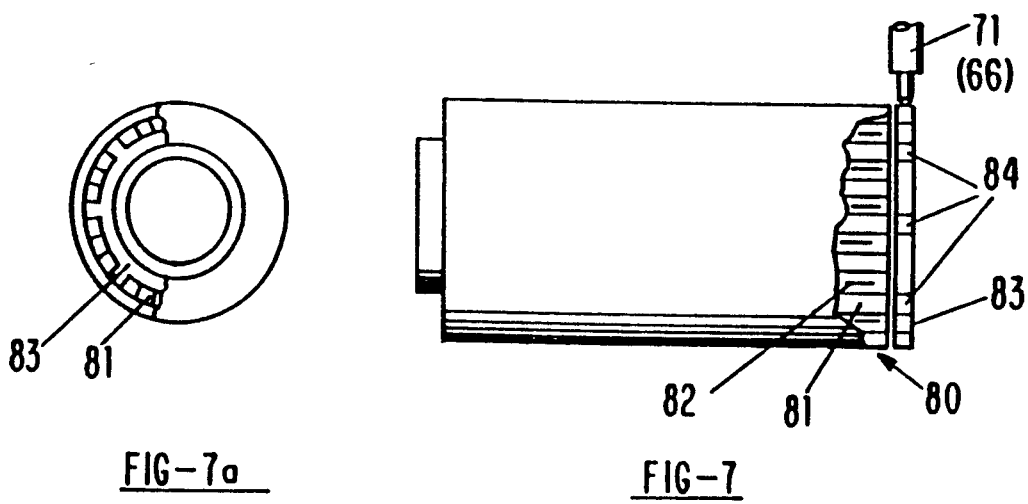
FIG. 7 shows a controllable diesel fuel preheater having a rotary slide valve.
FIG. 7a is a part-sectional view from the right of FIG. 7.

The diesel fuel preheater 80 according to FIG. 7 has an inner tube through which the cooling water streams and furthermore has at least at its outer mantle surface area axially extending ribs 81 which form the channels 82 for the diesel fuel to be preheated. At least one end of the channels 82 is provided with a rotary slide valve 83 which at its outer circumference has teeth 84. The teeth 84, when the heat exchanger is operating at full load, are positioned behind the ribs 81. Expediently, the number of teeth at the rotary slide valve 83 is smaller than the number of channels 82 so that when the valve 83 is rotated the diesel fuel flow is shut off only for a portion of the channels 82, respectively, reduced for a portion of the channels 82 while the other channels are continuously open.

As can be seen from FIG. 7 a tooth 84 of the rotary slide valve 83 is positioned behind each second rib 81. Thus, the oversized heat exchanger, for example, during cold start and cold running conditions of the engine, is switched on with all its channels 82 being open and when the engine operation temperature is reached the rotation of the rotary slide valve 83 reduces its power to a partial load. During the partial load stage the diesel fuel flows only through a few channels 82 at a higher speed so that the diesel fuel is heated to a lesser degree. The rotary slide valve 83 may be connected to a piston 71 or to a thermostat 66 which may be of the strain gauge or bimetal type. In this embodiment, a small adjusting path is sufficient for the limitation or control of the diesel fuel temperature. The heat exchanger 80 may expediently be manufactured from standard parts by simply inserting a tube with ribs concentrically into another tube.

The diesel fuel preheaters shown above may not only be used for diesel fuel but can be used for any other type of fuel.

The present invention is, of course, in no way restricted to the specific disclosure of the specification and drawings, but also encompasses any modifications within the scope of the appended claims.

What I claim is:

1. A diesel fuel preheater for engines in which the diesel fuel is heated electrically and by a heat exchanger, comprising:

an electric heating chamber positioned downstream of said heat exchanger;

a 3/2 way valve connected to said electric heating chamber and said heat exchanger, said 3/2 way valve, in an activated state thereof, guiding a flow of diesel fuel through said heat exchanger and said heating chamber, and, in a deactivated state thereof, guiding a portion of said flow of diesel fuel through said heat exchanger, said 3/2 way valve comprising an adjustment means for regulating said flow of diesel fuel;

an electric heating means fastened within said heating chamber; and a switching unit connected to said heating means.

2. A diesel fuel preheater for engines according to claim 1, wherein said adjustment means is a displaceable piston, partially comprised of a ferromagnetic material, positioned in a slidable manner within said heating means and said 3/2 way valve.

3. A diesel fuel preheater for engines according to claim 2, further comprising a device for adjusting a rest position of said piston.

4. A diesel fuel preheater for engines according to claim 2, further comprising a thermostat that is arranged within said heating chamber and acts on said piston.

5. A diesel fuel preheater for engines according to claim 1, wherein said heating means comprises a heating coil.

6. A diesel fuel preheater for engines according to claim 5, wherein said heating means further comprises a PTC heating element fastened within said heating chamber adjacent to an outlet thereof and directly adjacent to said heating coil, said PTC heating element being in a serial connection with said heating coil.

7. A diesel fuel preheater for engines according to claim 1, wherein said heating means is comprised of a material having a positive temperature coefficient.

8. A diesel fuel preheater for engines according to claim 1, further comprising a PTC measuring element positioned at an outlet of said heating chamber and connected to said switching unit.

9. A diesel fuel preheater for engines according to claim 1, wherein said heating means is an exchangeable heating cartridge positioned within said heating chamber.

10. A diesel fuel preheater for engines according to claim 1, wherein said heat exchanger is comprised of a tube having a heat-delivering medium flowing through an interior thereof and diesel fuel streaming past an exterior mantle surface thereof which functions as a heat exchanging surface, said tube having an annular disk at ends thereof, with said exterior mantle surface being provided with ribs extending in an axial direction between said annular disks such that a first end is connected to said annular disks and a second end is spaced at a distance from said annular disks, with adjacent ones of said ribs alternatingly providing a space at a respective one of said annular disks, thereby forming a meandering channel system, with a transverse stay positioned between two of said adjacent ribs and closing said channel system, with bores being provided on either side of said transverse stay for connecting said 3/2 way valve to said channel system.

11. A diesel fuel preheater for engines according to claim 1, wherein said heat exchanger is comprised of a cup-shaped housing which is immersed in a heat-delivering medium, said housing having inner and outer ribs, with said heating means being in the form of an exchangeable heating cartridge that is coaxially surrounded by a tube that is open at one end thereof, said heating cartridge together with said tube delimiting said heating chamber and being inserted into an interior of said housing, said tube together with said inner ribs forming channels, said heating chamber being connected with one end that is formed by said open end of said tube being connected to said channels and with the other end to said 3/2 way valve.

12. A diesel fuel preheater for engines according to claim 1, wherein said heat exchanger comprises a tube with radial outer ribs, said tube with an outer mantle surface thereof being in contact with the diesel fuel and with an inner mantle surface thereof being in contact with a heat-delivering medium, said ribs having varying outer diameters and being arranged over a length of said tube in groups corresponding to identical ones of said outer diameters, said tube being provided with a sliding sleeve with a plurality of radial cutouts that are arranged in pairs opposite one another over a length of said sliding sleeve, said radial cutouts providing openings to expose said ribs, said sliding sleeve being connected to said adjustment means which is in the form of a displaceable piston.

13. A diesel fuel preheater for engines according to claim 1, wherein said heat exchanger comprises a tube with axial ribs, said tube with an outer mantle surface thereof being in contact with the diesel fuel and with an inner mantle surface thereof being in contact with a heat-delivering medium, with said ribs forming axial channels, and with a rotary slide valve being positioned at at least one end of said axial channels and connected to said adjustment means, said rotary slide valve controlling said flow of diesel fuel through said axial channels by opening and closing at least some of said axial channels.

14. A diesel fuel preheater for engines according to claim 1, wherein said heat exchanger comprises an inner and an outer tube arranged concentrically to one another and providing therebetween an annular space for the diesel fuel, with an interior of said inner tube providing space for a heat-delivering medium, with a coil of a band-shaped heat-conducting tensile material being arranged within said annular space and contacting surfaces of said inner and outer tubes to form a channel for the diesel fuel, with said coil being removable from at least one of said surfaces of said inner and outer tubes for adjusting a heat transfer to the diesel fuel.

15. A diesel fuel preheater for engines according to claim 14, wherein said coil is at least partially formed of a gauze-like material.

16. A diesel fuel preheater for engines according to claim 14, wherein said coil is fastened with one end thereof to said inner tube and with the other end to said outer tube, with said inner and said outer tubes being adjustable relative to one another for adjusting said heat transfer to the diesel fuel.

17. A diesel fuel preheater for engines according to claim 14, wherein said adjustment means is a strain gauge thermostat that is connected to said coil.

* * * * *